Jan. 17, 1956  C. W. HUSUM  2,731,071

METHOD OF SECURING GASKETS IN CONTAINER CLOSURES

Filed April 12, 1955

INVENTOR
CHARLES W. HUSUM
BY
Rule & Hoge
ATTORNEYS

A United States Patent Office 2,731,071
Patented Jan. 17, 1956

2,731,071

METHOD OF SECURING GASKETS IN CONTAINER CLOSURES

Charles W. Husum, Toledo, Ohio, assignor to Owens-Illinois Glass Company, a corporation of Ohio Application April 12, 1955, Serial No. 500,799

6 Claims. (Cl. 154—89)

The present invention relates to improvements in closures or caps for bottles, jars, and the like glass containers and more particularly is a novel and highly effective method for securing rubber sealing rings or gaskets in such closures.

It has been more or less conventional practice heretofore to secure these sealing rings in closures by one of the following processes. In some instances, the skirt or attaching flange of the closure is enlarged radially in proximity to the panel or top portion so as to provide an annular recess which will accommodate a portion of the gasket and at least in theory prevent accidental displacement. This, however, in practice has been only a theory since frequently gaskets or sealing rings are lost during handling, with the result that the closures very often are applied to the containers without the absence of the gasket having been detected. As a consequence, there can be no sealing of the container. A second procedure where a metal closure is involved is to mechanically clinch the gasket in place by encompassing a portion thereof with an inwardly and upwardly directed curl or bead provided at the lower margin of the attaching skirt. This, however, and particularly where the gasket is of substantially reduced thickness, often results in cutting through the gasket. It has also been the practice, in some quarters, to simply turn the lower margin of the closure skirt radially inward to thereby provide a supporting shelf or flange which, although it may serve fairly well to prevent accidental displacement, nevertheless permits rolling of the gasket incident to application of the closure so that the closure cannot be fully applied and an imperfect seal of the container unavoidably results.

In some instances the practice has been to secure unvulcanized rubber gaskets or rings in metal closures by vulcanizing them in position under heat and pressure. This, however, has proved to be highly unsatisfactory because of the lack of the necessary resiliency which is an important factor contributing to the successful functioning of any sealing ring or gasket.

An object of my invention is to completely overcome the foregoing objections through the provision of a novel and effective methd of securing the sealing ring or gasket at any point or location desired in the closure shell and doing so in such fashion that the gasket will remain in place permanently. To this end my invention provides for the coating of a vulcanized, fully cured, rubber tube with a thermosetting or thermoplastic heat and pressure sensitive adhesive, drying such coating until it presents a nontacky surface; then cutting ring gaskets from this tube and under the influence of heat and pressure bonding the coated surface to either the attaching skirt or the panel portion of the metal closure shell.

Other objects will be in part apparent and in part pointed out hereinafter.

Figs. 5 to 9 inclusive are cross-sectional views more or less schematically illustrating several different positions which may be assumed by the sealing gasket in the metal closure shells and in all instances with the coated surfaces of the gasket in contact with the metal closure shell.

Figure 5:
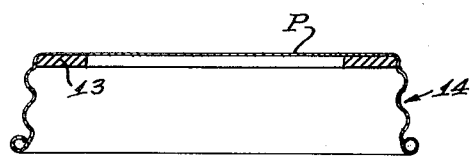

Fig. 5 shows the ring gasket secured to the inner surface of a plain panel portion.

Figure 6:
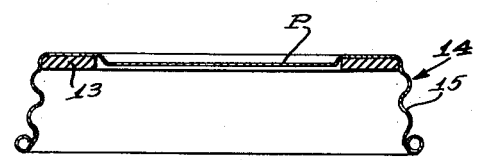

Fig. 6 is a similar view to Fig. 5 differing therefrom in that the panel portion is recessed.

Figure 7:
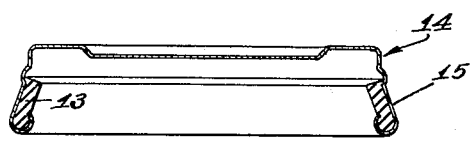

Fig. 7 is a sectional view of a side seal closure in which the sealing ring lies against and is adhesively secured to the skirt.

Figure 8:
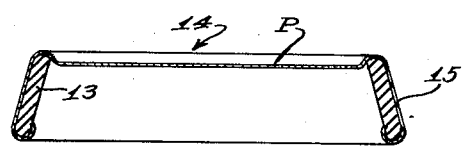

Fig. 8 is a sectional view of a slight modification of the cap shown in Fig. 7.

Figure 9:
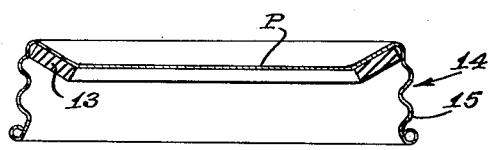

Fig. 9 is another form of screw cap similar to Figs. 5 and 6 but in which the sealing ring is disposed at a slight angle.

In accordance with my method a tube 10 of vulcanized rubber which has been fully cured, is placed upon a mandrel 11, the latter then being rotated about its axis in proximity to a spray head 12 from which a thermoplastic adhesive is emitted for application to the exterior surface of the tube. This spray head may be reciprocated longitudinally of the mandrel so as to uniformly distribute the coating over the tube surface. Additionally, this adhesive may be applied as a heated spray, to thereby avoid the need for baking, following such application. Alternatively the coating may be brushed or rolled onto the outside surface of the tube. It is important in any event that the coating ultimately be entirely free of any tackiness since otherwise the gaskets, when hoppered, etc. may adhere to one another.

The adhesive may, for example, be a synthetic rubber latex such as Hycar American rubber latex #1577 which is a product of the B. F. Goodrich Chemical Company. Other thermoplastic adhesives may be utilized, the main requirement being that they must be heat and pressure sensitive.

Following coating of the tube 10, it is cut by conventional devices into so-called ring or sleeve-type sealing gaskets 13, which then are positioned in the metal closure 14. Only where the closure is of the so-called side seal type shown in Figs. 7 and 8 can the gaskets be dropped into the closures 14 and without any orientation, secured in place. In the arrangement of Figs. 7 and 8 such is possible simply because the coated surface of the gasket is already positioned for contact with the interior skirt 15 of the closure.

Figure 1:
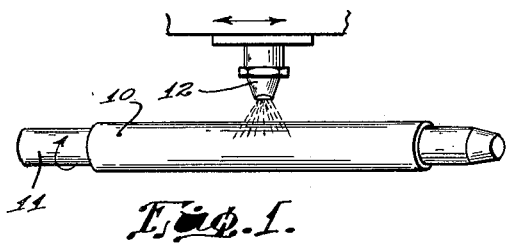
Fig. 1 is an elevational view illustrating one possible form of apparatus for coating the vulcanized tube.
Figure 2:
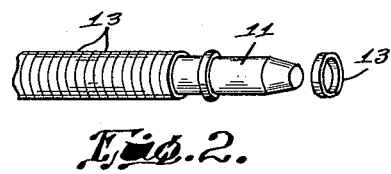
Fig. 2 is a fragmentary perspective view showing the tube after having been severed to produce a plurality of ring gaskets.
Figure 3:
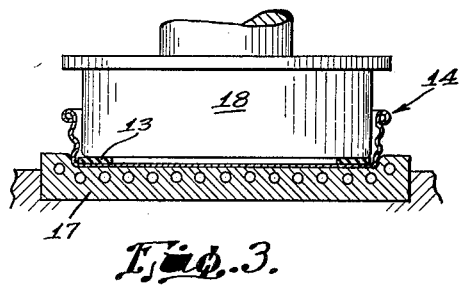
Fig. 3 is a sectional elevational view illustrating one form of apparatus for practicing my improved method.
Figure 4:
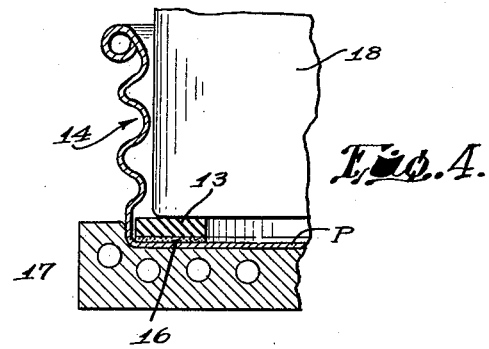
Fig. 4 is a detailed fragmentary sectional view of the apparatus shown in Fig. 3 and shows the adhesive coating on one surface of the sealing ring.

In the other forms of the closure and gasket arrangement, however, twisting, or orientation, of the gasket is necessary to the end that the adhesive coating 16 will be properly positioned for contact with the surface to which the gasket is to be bonded. Such has been resorted to incident to affixing the gasket to the panel P to provide a top seal for the screw cap shown in Figs. 3 and 4, as is apparent.

Although other specific devices may well be utilized I have for the purposes of illustration shown same as comprising a heated holder 17 for the closure 14 and a pressing head 18 insertable into the closure for the purpose of firmly holding the gasket in position against the panel portion P while heat sets the adhesive and creates the bond. Obviously, either or both the holder 17 and pressing head 18 may be heated. It is also possible in some circumstances to position the gaskets in the closures and then stack such closures so that nested closures themselves serve as the gasket retaining means. Such stacked or nested closures then are exposed to sufficient heat to convert and set the adhesive. In this instance it, of course, is imperative that the adhesive be very sensitive to heat and pressure because the total pressure involved in all probability would merely be that represented by the weight of the closures themselves.

In the apparatus illustrated the holder 17 applies heat directly to the panel P of the closure since this is the area to which the gasket is to be bonded. Where the closure is of the side seal form, perhaps as shown in Figs. 7 and 8, this holder may, if desired, be extended upwardly along the skirt 15, or alternatively the pressing head 18 may be heated and shaped to correspond more or less closely to the interior contour of the closure itself.

Modifications may be resorted to within the spirit and scope of the appended claims.

I claim:

1. The method which consists in coating the exterior surface of a vulcanized rubber tube with a heat and pressure sensitive adhesive, severing the tube into ring-type sealing gaskets, placing one such gasket in a closure shell with the coated surface in firm contact with that area of the closure surface to which the gasket is to be bonded, and applying heat and pressure to the closure shell and gasket to thereby effect the bond.

2. The method defined in claim 1 in which the pressure is applied to the gasket by positioning a pressing head in the closure shell in firm holding contact with the gasket.

3. The method defined in claim 1 in which heat and pressure are applied by placing the closure shell in a heated holder and inserting a pressing head in the shell in firm holding contact with the gasket.

4. The method which consists in coating the exterior surface of a vulcanized rubber tube with a thermoplastic adhesive by means of a heated spray of such adhesive, allowing the applied adhesive to cool, severing the tube into ring-type sealing gaskets, placing one such gasket in a closure shell, orienting the gasket to bring the coated surface into engagement with that surface of the closure shell to which the gasket is to be bonded, firmly holding the gasket against said surface and applying heat to the closure shell and gasket to effect such bond.

5. The method defined in claim 4 in which the pressure is applied to the gasket by inserting a pressing head into the closure shell in firm contact with the gasket.

6. The method defined in claim 4 in which the heat is applied to the closure shell by placing the latter in a heated holder and the pressure is applied by inserting a pressing head into the shell in contact with the gasket.

References Cited in the file of this patent

UNITED STATES PATENTS

| | | |
|---|---|---|
| 887,883 | Wheeler | May 19, 1908 |
| 1,162,384 | Nichols | Nov. 30, 1915 |
| 1,869,480 | Johnson | Aug. 2, 1932 |